United States Patent [19]
Schaefer

[11] 3,907,601
[45] Sept. 23, 1975

[54] VINYL BATTERY SEPARATORS

[75] Inventor: Hugh Ferdinand Schaefer, Lakewood, Ohio

[73] Assignee: Union Carbide Corporation, New York, N.Y.

[22] Filed: Feb. 14, 1972

[21] Appl. No.: 226,036

Related U.S. Application Data

[62] Division of Ser. No. 12,034, Feb. 17, 1970, abandoned.

[52] U.S. Cl. ............... 136/131; 136/146; 136/148; 136/158
[51] Int. Cl. ............................................ H01m 9/04
[58] Field of Search ........... 136/131, 146, 138, 153, 136/157, 158, 107, 155, 154; 260/89.7 R

[56] References Cited
UNITED STATES PATENTS

| | | | |
|---|---|---|---|
| 2,794,753 | 6/1957 | Duddy | 136/146 |
| 3,018,316 | 1/1962 | Higgins et al. | 136/157 |
| 3,278,506 | 10/1966 | Chamot et al. | 260/89.7 R |
| 3,509,113 | 4/1970 | Monagle et al. | 260/89.7 R |
| 3,586,539 | 6/1971 | Lauck | 136/158 |
| 3,595,702 | 7/1971 | Krey | 136/157 |
| 3,663,518 | 5/1972 | Patzelt et al. | 260/89.7 R |

*Primary Examiner*—Donald L. Walton
*Attorney, Agent, or Firm*—C. J. Vicari

[57] ABSTRACT

An electrochemical cell of the Leclanche type comprising a depolarizer mix in the form of a dry molded bobbin wherein a vinyl material is utilized as the electrolyte immobilizing separator layer instead of conventional starch and/or flour paste mixtures. The method of manufacturing the cell comprises predetermination and control of the viscosity levels of the electrolyte-separator solution prior to and during gelation in situ by qualitative and quantitative control of the composition thereof prior to insertion into the cell.

13 Claims, 1 Drawing Figure

US Patent    Sept. 23, 1975    3,907,601
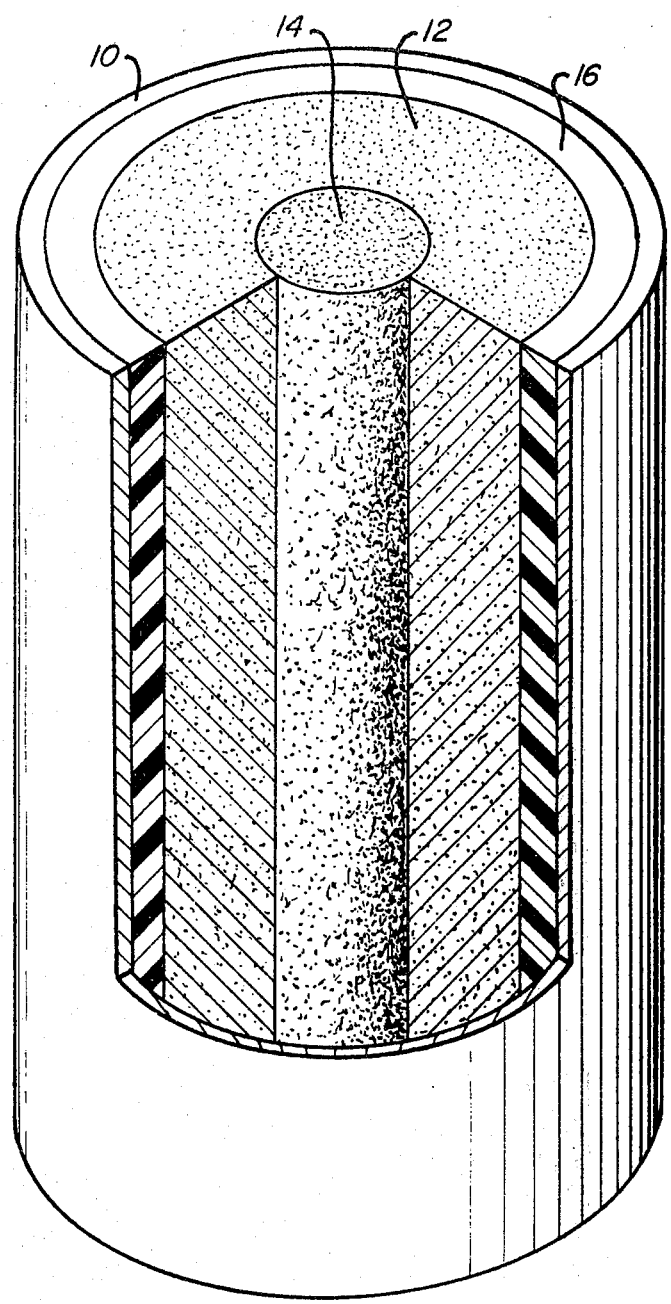
INVENTOR
HUGH F. SCHAEFER
BY A. Musumeci

VINYL BATTERY SEPARATORS

This is a division of application Ser. No. 12,034 filed Feb. 17, 1970, now abandoned.

The present invention relates to manufacture of electrochemical cells and particularly to separators for conventional dry cell batteries commonly referred to as Leclanche cells. More specifically, the invention contemplates utilization of vinyl polymer gels as separator material.

BACKGROUND OF THE INVENTION

There are two basic types of separators currently in commercial use in Leclanche cells: the gelatinous paste type (cooked or cold set) formed from starch and/or flour paste mixtures and used with a depolarizer mix in the form of a premolded bobbin; and the membrane type utilizing a thin layer of a material such as starch, flour or methyl cellulose which may be used unsupported or supported on a paper backing or on the anode itself and which is used in conjunction with a rammed wet depolarizer mix. The present invention is concerned solely with the first-mentioned type of Leclanche cell construction.

The prospect of practical utilization of vinyl polymers instead of starch-flour paste presents a significant opportunity for development and manufacture of cells exhibiting greatly improved leakage characteristics and shelf and service life. However, in order to enable utilization of vinyl polymers as battery separators substantial obstacles and problems pertaining to cell manufacture and assembly must be overcome.

Conventional Leclanche dry cell batteries of the type contemplated for use with the present invention generally include a depolarizer mix in the form of a centrally located, annularly shaped cylindrical bobbin comprising a manganese dioxide depolarizer, a conductive matrix such as acetylene black and an ammonium chloride-zinc chloride electrolyte. A zinc anode, which also serves as an outer cell container or can, surrounds the bobbin with an electrolyte-immobilizing separator layer located in the space between the bobbin and the zinc can. Utilization of vinyl polymers for the separator material in such cells gives rise to certain significant advantages over starch-flour paste mixtures. Starch-flour paste separators are oxidized by manganese dioxide, thus reducing the discharge capacity of the bobbins and causing deterioration of the separator. Deterioration of the separator, which occurs to some degree under normal storage and operating conditions, is accelerated by high temperature storage and by heavy or rapid discharge. Formation of soluble organic materials within the cell as a result of deterioration of the separator contributes significantly to the volume and viscosity of a liquid product called "spew" which is composed of electrolyte and degraded separator material. Under severe conditions the entire separator can break down forming large quantities of spew with separator degradation products generally accelerating wasteful corrosion of the zinc anode leading to perforation of the can and consequent leakage. Also, formation of hydrogen gas can contribute to rupture of the can and emission of the liquid spew. The spew which is emitted is highly corrosive and capable of causing costly damage to equipment in which the leaking cells are utilized, as well as unsightly appearance of the cells.

Accordingly, it will be appreciated that failure of the electrolyte-immobilizing separator material to withstand abuse conditions to which a cell is subjected will contribute many undesirable characteristics to cell performance including poor shelf life, greater wasteful anode corrosion, decreased depolarizer capacity, poor cell performance on high drain applications or at high temperatures, greater cell leakage, lower short circuit amperages and increased cell gassing.

It has been found that vinyl polymers, which may be generally defined as those polymeric materials formed from monomers containing the vinyl group $CH_2=CH-$, are particularly suited for use as electrolyte-immobilizing separator agents for Leclanche cells. Utilization of these polymers has produced cells exhibiting greatly improved performance over starch-flour pastes with elimination or reduction of many of the attendant problems discussed above. With the separators of the present invention, spew volume is substantially reduced due to the fact that vinyl polymers are chemically resistant under cell conditions causing separator degradation. These materials exhibit superior stability and do not decompose as do other separators. Selected vinyl polymer gels essentially do not oxidize in contact with manganese dioxide and they are generally resistant to the effects of elevated temperature storage. Accordingly, when they are utilized as separator material, not only is spew volume substantially reduced, but the nature of the spew is different being much less viscous and more easily reabsorbed by the depolarizer mix.

The resultant effects of this superior performance include considerable reduction in leakage problems. Wasteful anode corrosion is substantially reduced and there is less cell gassing under abuse conditions, due to the absence of corrosive products of separator deterioration. Furthermore, the discharge performance of cells utilizing vinyl polymer separators has been found to be at least equivalent to cells utilizing starch-flour paste and more uniformly reproducible.

Accordingly, demonstrably improved cell life and performance may be achieved by appropriate utilization of vinyl polymer materials in the formation of separator layers. However, practical adaptability of such materials as separator layers in cell manufacture and assembly presents significant obstacles and problems.

One of the most important considerations pertains to the physical placement of the separator layer within the space between the $MnO_2$ mix bobbin and the surrounding zinc anode layer. The material inserted between the molded bobbin and the zinc anode which goes to form the separator layer includes the cell electrolyte which is physically immobilized in the separator material, and during the assembly process gelation of this separator-electrolyte solution must be achieved.

Placement of a separator-electrolyte solution into the annular space between the zinc anode and the molded bobbin requires that the solution be of a vicosity appropriate to permit the solution to flow to suitably occupy the space. Accordingly, a solution which retains sufficient liquidity during the placement process is required.

In cells utilizing a starch-flour paste separator, conventional techniques for placing the electrolyte-separator solution include pouring the solution into the zinc container and subsequently placing the bobbin therein, with downward pressure upon the bobbin being utilized to force the electrolyte-separator solution to flow upwardly to occupy the annular space surrounding the bobbin. The solution must comprise sufficient liquidity to permit such flow if this technique is to be utilized.

On the other hand, excessive liquidity of the separator-electrolyte solution can cause liquid penetration of the pressure molded bobbin before sufficient gelation can occur. Such unwanted bobbin penetration by the electrolyte-separator solution can detrimentally affect battery performance by causing softening, swelling and disintegration of the bobbin with resultant poor contact between the depolarizer and conductive particles as well as poor contact between the depolarizer mix and the cathode collector rod.

It should be clearly understood that the present invention is concerned with cells utilizing a particular type of bobbin. The invention specifically contemplates Leclanche cells which utilize a comparatively dry, pressure-molded bobbin of depolarizer mix. This type of cell should be distinguished from those where the electrolyte is provided as a component of a wet depolarizer mix which is tamped into place within the container. In the wet-mix type cell the problems discussed above, such as bobbin penetration, do not occur due to the basic dissimilarities between cell types. Furthermore, it should be understood that the terms "dry" and "comparatively dry" when used herein to refer to the molded bobbin define a bobbin which, as is well known to those skilled in the art, will usually contain approximately 16–20% by weight of water.

Accordingly, if the electrolyte is to be immobilized in an electrolyte-separator solution wherein the separator material used is a vinyl polymer material, it will be necessary to appropriately control the viscosity of such a solution in order to avoid the previously discussed problems caused by liquid penetration of the bobbin while simultaneously retaining sufficient liquidity to enable placement of the electrolyte-separator layer prior to complete gelation thereof.

It will, therefore, be apparent that certain significant obstacles are involved in achievement of a practical cell structure comprised of a separator of vinyl polymer material in a cell utilizing a dry pressure-molded bobbin.

It is a principal object of the present invention to provide a dry cell structure utilizing a vinyl polymer as separator material, as well as a practical method for assembly thereof.

A more specific object of the invention is to provide a method for forming in Leclanche dry cells a separator layer comprising vinyl polymer material avoiding undue liquid penetration of the molded $MnO_2$ mix bobbin.

A more specific object is to provide a method for achieving sufficient viscosity control of the electrolyte-separator solution utilized in Leclanche dry cells comprising vinyl polymer separator material to enable placement of the electrolyte immobilizing separator solution with conventional techniques without undue liquid penetration and consequent disintegration of the molded bobbin in the cell.

SUMMARY OF THE INVENTION

Briefly stated, the present invention may be described as a cell structure of the Leclanche type including a dry molded bobbin of depolarizer mix, wherein utilization of vinyl polymers as separator materials is enabled by a method conprising gelling of a solution of electrolyte and vinyl separator material by polymerization and cross-linking thereof in situ, and controlling the viscosity of said solution during gelation. The method includes predetermination and control of viscosity levels of the electrolyte-separator solution prior to and during gelation in situ by qualitative and quantitative control of the composition thereof prior to insertion into the cell.

The invention involves several specific aspects whereby the indicated viscosity control may be achieved. Three of the specific aspects of the invention described in detail hereinafter are:

1. Utilization of a complexing agent to effect substantial absence of interfering metal ions in the electrolyte-separator solution;

2. Utilization of a prethickened electrolyte solution of polyacrylamide combined in a gelling solution with additional vinyl monomer which is polymerized and cross-linked; and 3. Utilization of a complexing agent in a prethickened electrolyte solution of polyacrylamide combined in a gelling solution with additional vinyl monomer which is polymerized and cross-linked.

BRIEF DESCRIPTION OF THE DRAWING

A better understanding of the present invention may be had by reference to the following detailed description of preferred embodiments thereof taken in connection with the accompanying single FIGURE of the drawing which shows a perspective view partially broken away and in cross-section of a cell of the type contemplated by the present invention.

DESCRIPTION OF THE PREFERRED EMBODIMENTS

Referring to the drawing, there is shown the major elements of a Leclanche dry cell; a zinc can or container 10 forming the negative electrode, a pressure-molded dry bobbin 12 of depolarizer mix, a central carbon electrode 214 and an electrolyte-immobilizing separator layer 16. In the assembled cell, the electrolyte-immobilizing separator layer 16 occupies the annular space between the outer zinc can 10 and the bobbin 12. The method of the present invention is basically concerned with appropriate placement of this separator layer 16.

As previously stated, in the usual assembly procedure the solution containing the electrolyte and the separator material is first poured into the bottom of the zinc can 10, with the bobbin 12, in which the carbon electrode 14 has previously been placed, being pressed downwardly to force the electrolyte-separator solution to rise about the bobbin 12 to occupy the space between the can 10 and the bobbin 12 thereby forming layer 16. Gelation of the solution is occurring during this assembly procedure, and in the finally assembled cell the layer 16 comprises a solid, gelled mass of electrolyte-immobilizing separator material. However, during the procedure whereby the bobbin 12 is pressed downwardly to displace the gelling solution from the bottom of can 10, the solution must exhibit sufficient fluidity to ne displaced from the bottom of the can 10 to around the bobbin 12 to occupy the indicated space.

When certain vinyl monomers are dissolved in Leclanche electrolyte, such solutions may be as liquid as water before gelation and they will penetrate pressure-molded bobbins of acetylene black and manganese dioxide with the undesirable effects previously discussed.

Accordingly, although insufficient fluidity during assembly will interfere with appropriate displacement of the electrolyte-separator solution into the space between the can 10 and the bobbin 12, the opposite extreme, whereby an unduly low viscosity causes bobbin liquid penetration, must also be avoided.

In a very general sense, the basic composition of the electrolyte-separator solution utilized in the Leclanche cells contemplated by the present invention will comprise: the electrolyte, which may be the usual Leclanche electrolyte consisting of $NH_4Cl$, $ZnCl_2$, $HgCl_2$ and $H_2O$ in appropriate proportions; the vinyl material initially in monomer form which is polymerized and cross-linked to achieve gelling of the solution; a polymerization catalyst; a promoter; and a cross-linking agent.

In defining the term "Leclanche-type cell", particularly in connection with its use in the claims herein, it is intended that there be included cells wherein the electrolyte utilizes zinc chloride even to the exclusion of ammonium chloride.

It is important to note that a major achievement of the present invention is that it enables the use of vinyl monomers in the type of Leclanche cell which would otherwise utilize starch-flour paste as the separator. A further significant achievement is that it is not required that the monomer used be chosen from among only one or a few vinyl materials. Rather, there is enabled a wide choice of vinyl monomers which may be used in the gelling solution. Of course, in determining the practical optimum usefulness of a particular vinyl monomer some important restrictions must be observed, but these relate more to making a choice that will provide optimum practicality under specific use conditions.

The monomer to be used should be soluble in the electrolyte to at least 2 percent so that a reasonably rigid gel structure will be obtained. Additionally, the monomer should polymerize rapidly, completely and homogeneously in order for optimum gel structure to be obtained. It would be best if such polymerization were to occur with the smallest possible concentrations of promoter and polymerization catalyst since unduly large quantities of these materials which might be required to completely polymerize some of the more sluggish vinyl monomers could accelerate zinc corrosion, cell gassing, manganese dioxide reduction and rate of cell shelf deterioration. Furthermore, the resulting gelled separator made with this polymer should not only be resistant to oxidation, reduction and hydrolysis over the expected temperature range of cell use and storage, but it should also be reasonably adherent to the anode and not form insoluble zinc salts which would interfere with battery operation. In choosing a successful vinyl monomer for a specific application consideration should also be given to the fact that the polymer-electrolyte gel should be sufficiently adherent to the cathode and anode surface, have a moist surface, be nonsynerizing and nonshrinking, and exhibit the aforementioned properties over the pH range, ammonium chloride and/or zinc chloride concentration range, and temperature range to be expected under actual discharge and storage conditions.

A relatively large number of vinyl monomers useful with the present invention are known. Some of these monomers are set forth in Table I below.

TABLE I

| | |
|---|---|
| SALTS OF MONOBASIC VINYL MONOMERS | Zinc Methacrylate<br>Zinc Acrylate<br>Calcium Acrylate<br>Magnesium Methacrylate<br>Magnesium Acrylate<br>Sodium Acrylate<br>Sodium Methacrylate<br>TMED Salt of Acrylic Acid<br>Barium Acrylate<br>Barium Methacrylate<br>Sodium Vinyl Sulfonate |
| SALTS OF DIBASIC VINYL MONOMERS | Calcium Fumarate<br>Disodium Maleate<br>Disodium Fumarate |
| AMINOALCOHOL ESTERS OF MONOBASIC VINYL MONOMERS | Tertiary Butylaminoethyl Methacrylate<br>N,N'-Diethylaminoethyl Methacrylate<br>N,N'-Diethylaminoethyl Acrylate |
| GLYCOL AND "CELLOSOLVE" ESTERS OF MONOBASIC VINYL MONOMERS | 2-Hydroxypropyl Methacrylate<br>Propylene Glycol Monoacrylate<br>2-Hydroxyethyl Monomethacrylate<br>2-Methoxyethyl Methacrylate |
| CHLORINE-CONTAINING VINYL MONOMERS | 2-Chloro-1-Propene<br>Chloromaleic Anhydride<br>Ethyl α-Chloroacrylate<br>2-Chloro-N,N-Diallyl Acetamide<br>Acryloyl Chloride |
| VINYL AMIDES AND ACRYLONITRILE | Acrylamide<br>Methacrylamide<br>Methylene Bis-Acrylamide<br>Acrylonitrile<br>N-Hydroxymethyl Acrylamide<br>N-Methyl Acrylamide |
| DIFUNCTIONAL VINYL MONOMERS | Divinyl Sulfone<br>N-Vinyl Succinimide |
| VINYL MONOMERS GENERATED IN SITU VIA KETO-ENOL TAUTOMERISM | Tertiary Butyl Acetoacetate<br>Ethyl Trifluoroacetoacetate<br>Ethyl α-Allyl Acetoacetate |

All of the monomers listed were actually utilized in cells assembled for experimental purposes. Each of these monomers when polymerized in situ in accordance with the invention provided cell service on a 2.25 ohm continuous discharge test which was equal to or better than similar cells made with a conventional starch paste separator.

It should be further understood that in making a selection of a monomer for use in a particular Leclanche cell, certain ordinary precautions obvious to those skilled in the art should, of course, be observed. For example, vinyl monomers which are acids, such as acrylic and methacrylic, vinyl sulfonic, and the like, must be neutralized to the pH in the Leclanche system before use, because these monomers and their polymers are too corrosive toward zinc unless neutralized to pH 4 and their polymerization rate is too slow in Leclanche electrolyte at room temperature if the electrolyte pH is below 4.

1. Utilization of a Complexing Agent to Effect Substantial Absence of Interfering Metal Ions in the Electrolyte-Separator Solution One primary specific aspect of the invention pertains to trace metallic impurities which may be present in the ingredients utilized and is based upon the discovery of the nature of the cause and effect relationship created by these impurities and the means available, in accordance with the invention, to overcome or minimize the undesirable effects of this relationship.

When a vinyl monomer, e.g., acrylamide, is polymerized in Leclanche electrolyte the impurities present in the zinc chloride could affect the reproducibility of the solution viscosity and of the gelling time. Iron and copper particularly, which are present in small concentrations in commercial grade zinc chloride, seriously detract from the ability to predict and control solution viscosity due to the fact that they effect changes in the course of the polymerization. The presence of iron during polymerization causes the formation of short chain polymers rather than desired long chain polymers. Traces of copper accentuate the properties of iron and exert a synergistic effect thereon. Solution stability may be adversely affected and the persulfate of the polymerization catalyst can be caused to decompose too soon and too rapidly.

As previously discussed, there exist serious problems, related either to undue liquid bobbin penetration or to inability to achieve formation of the electrolyte-separator layer in the desired location, when the viscosity and stability of the electrolyte-separator solution cannot be maintained with regularity within predetermined limits. It would be possible in principle to cope with the problems created by impurities either by utilization of purer chemicals or by use of increased quantities of monomer in an attempt to obtain appropriate viscosity levels. However, neither expedient is attractive because they involve increased cost. Also, even the use of reagent grade chemicals will not eliminate the problems entirely since the undesirable effects of metallic impurities will be encountered with reagent grade ammonium chloride and zinc chloride which contain as little as 1 ppm of iron (0.0001% by weight).

The aforementioned problems may be overcome in accordance with the present invention by utilization in the electrolyte of a complexing or chelating agent which has a high affinity for transition metal ions such as iron and copper, but which would be compatible with the Leclanche system itself. The material utilized as the complexing or chelating agent should not form insoluble salts with zinc, it should be as inert as possible toward oxidation by persulfate and manganese dioxide, and it should not form insoluble mercury salts which would interfere with zinc amalgamation. A specific example of a suitable complexing agent is ethylenediaminetetraacetic acid (EDTA) and its various sodium salts, which are commercially available and which may be commercially obtained under the trademarks "Versene" and "Sequestrene". Another specific example is "Versene Fe-3" which is a product of Dow Chemical Co. and is a mixture of three parts of EDTA and one part of N-hydroxymethyl ethylenediaminetriacetic acid. Other specific examples are nitrilotriacetic acid, also referred to as ammonia triacetic acid, and N-methyliminodiacetic acid.

Utilizing 0.3 to 1.0 weight percent of complexing agent, based upon electrolyte solution weight, and introducing this amount of complexing agent into Leclanche electrolyte containing iron within a range of 2 to 23 ppm, substantially eliminates the troublesome variation in solution viscosities and gelling times. Further, undesirably low viscosities of the solutions prior to gelling which are caused by low polymer molecular weight in the presence of the metallic impurities can be increased by multiples of from 1,000 to 10,000 with the addition of the complexing agent even with the same initial concentration of vinyl monomer.

A detailed example of this specific aspect of the invention is given below in Table II which lists the ingredients comprising an electrolyte-separator solution formed in accordance with the present invention setting forth the amount and relative weight proportion of each ingredient.

TABLE II

| Ingredient | Amount | % by Weight |
|---|---|---|
| Methacrylamide monomer | 5.0 grams | 10.0 |
| Leclanche Electrolyte (24% NH$_4$Cl, 6.52% ZnCl$_2$, 0.58% HgCl$_2$) | 42.8 grams | 85.7 |
| Versene Fe-3 | 0.15 grams | 0.3 |
| Polymerization Catalyst (ammonium persulfate) | 1.0 grams | 2.0 |
| Cross-linking Agent (methylene bis-acrylamide) | 0.56 grams | 1.1 |
| TMED Promoter (N,N,N',N'-tetramethylethylenediamine) | 0.5 ml | 0.8 |

The above-listed ingredients were thoroughly mixed and the resulting solution was quickly metered into cell containers. The persulfate polymerization catalyst was the last ingredient added since it effects the onset of gelation, and bobbins were inserted 12 minutes after the polymerization catalyst was added to the electrolyte just before the onset of gelation. At 25°C. gelation was complete in 12.5 minutes.

Additional embodiments of the same specific aspect of the invention exemplified in Table II are set forth below in Tables II-*a* to II-*g*.

TABLE II-a

| | Amount | % By Weight |
|---|---|---|
| Na Methacrylate | 2.6 gm | 5.0 |
| Leclanche Electrolyte (23% NH$_4$Cl, 28% ZnCl$_2$, 0.25% HgCl$_2$) | 50.0 gm | — |
| TMED Promoter | 1.0 ml | 1.6 |

Bobbins inserted 15 minutes after persulfate added.

TABLE II-b

| | Amount | % By Weight |
|---|---|---|
| Acrylic Acid | 1.1 ml | 2.0 |
| Leclanche Electrolyte (23% NH$_4$Cl, 28% ZnCl$_2$, 0.25% HgCl$_2$) | 50.0 gm | — |
| TMED Promoter | 2.4 ml | 4.2 |

Bobbins inserted 2.5 minutes after persulfate added at room temperature.

TABLE II-c

| | Amount | % By Weight |
|---|---|---|
| Acrylic Acid | 1.1 ml | 2.0 |
| Leclanche Electrolyte (24% NH$_4$Cl, 6.52% ZnCl$_2$, 0.58% HgCl$_2$) | 50.0 gm | — |
| TMED Promoter | 1.5 ml | 2.4 |

Bobbins inserted 4.5 minutes after persulfate added.

TABLE II-d

| | Amount | % By Weight |
|---|---|---|
| Methacrylic Acid | 1.3 ml | 2.0 |
| Leclanche Electrolyte (23% NH$_4$Cl, 28% ZnCl$_2$, 0.25% HgCl$_2$) | 50.0 gm. | — |
| TMED Promoter | 2.6 ml | 4.4 |

Bobbins inserted 10 minutes after persulfate added at room temperature.

TABLE II-e

| | Amount | % By Weight |
|---|---|---|
| Methacrylic Acid | 1.3 ml | 2.0 |
| Leclanche Electrolyte (24% NH$_4$Cl, 6.52% ZnCl$_2$, 0.58% HgCl$_2$) | 50.0 gm | — |
| TMED Promoter | 2.0 ml | 4.0 |

TABLE II-a-Continued

| | Amount | % By Weight |
|---|---|---|

Bobbins inserted 7 minutes after persulfate added at room temperature.

Table II-f

| | Amount | % By Weight |
|---|---|---|
| N,N-Dimethyl Acrylamide | 1.5 ml | 2.0 |
| Leclanche Electrolyte (24% NH₄Cl, 6.52% ZnCl₂, 0.58% HgCl₂) | 50.0 gm | — |
| TMED Promoter | 0.50 ml | 0.8 |

Bobbins inserted 10 minutes after persulfate added at room temperature.

TABLE II-g

| | Amount | % By Weight |
|---|---|---|
| N,N-Dimethyl Acrylamide | 1.5 ml | 2.0 |
| Leclanche Electrolyte (23% NH₄Cl, 28% ZnCl₂, 0.25% HgCl₂) | 50.0 gm | — |
| TMED Promoter | 1.0 ml | 1.6 |

Bobbins inserted 8 minutes after persulfate added at room temperature.

In each of the examples set forth above in Tables II-*a* to II-*g*, the chelating agent, the polymerization catalyst and the cross-linking agent are the same ingredients, with each being provided in the same relative % by weight proportions, as set forth in Table II.

2. utilization of a Prethickened Electrolyte Solution of Polyacrylamide Combined in a Gelling Solution With Additional Vinyl Monomer Which is Polymerized and Cross-linked A second important specific aspect of the present invention utilizes the concept that a stable electrolyte-separator solution of controlled viscosity may be obtained by polymerization without cross-linking of acrylamide monomer in aqueous solution with the electrolyte components, whereby the electrolyte solution becomes prethickened prior to cell assembly and final gelation. This prethickened polyacrylamide electrolyte solution, which will be referred to herein as in "initial" solution, may be combined with a vinyl monomer, including but not limited to acrylamide monomer, with the combined solution being gelled after placement within the cell container by polymerization and cross-linking of the added vinyl monomer in the presence of a polymerization catalyst, polymerization promoter and cross-linking agent.

It should be emphasized that this second specific aspect of the invention is importantly characterized by the fact that the gelation procedure involves two steps: first, acrylamide monomer is prethickened in the initial solution by polymerization without cross-linking; and, secondly, this initial solution is combined for final gelation in situ with other ingredients which include additional vinyl monomer, which may or may not be acrylamide, for additional polymerization and cross-linking. Another important characteristic of this second specific aspect of the invention is the fact that acrylamide has been found to produce uniquely advantageous results. Of a number of vinyl monomers examined for the prethickening step in the initial solution, only acrylamide appears to be suitable. Accordingly, although many other vinyl monomers may be used in the second procedure whereby the initial solution of prethickened polyacrylamide is combined with other gelation ingredients, only acrylamide is contemplated by the present invention for use in forming the prethickened initial solution. This technique uniquely results in prethickened initial solutions exhibiting controlled stable viscosities at pH factors between 4 and 6 over long periods of time even at elevated temperatures. Consequently, these solutions may be prepared in advance and stored for extended periods for use when desired for insertion into cell containers. These characteristics of the initial solutions of the present invention make such initial solutions advantageously adaptable to mass production techniques in the manufacture of batteries comprising vinyl polymer separators. Furthermore, cells manufactured by utilizing the prethickened initial solution exhibit better and more uniform service than those cells made by utilizing a fluid monomer solution which is polymerized and cross-linked in situ in a single operation.

To obtain controlled solution viscosity by use of acrylamide, the initial solution may be obtained by introduction of polyacrylamide into Leclanche electrolyte as a solid polymer. Alternatively, solid acrylamide monomer may be polymerized in water to the desired viscosity, after which the necessary amounts of zinc chloride and ammonium chloride are dissolved in the initial solution to give the final prethickened Leclanche electrolyte. Both these approaches, however, tend to produce non-homogeneous solutions with less than optimum viscosity control. Moreover, the first approach may produce a solution wherein added monomer is not stable, but could polymerize further unless the solid polymer used is carefully purified and free of active polymerization sites, catalysts, etc. Accordingly, the preferred approach according to the present invention comprises polymerization of a given concentration of acrylamide monomer directly in the Leclanche electrolyte thereby producing a stable, controlled-viscosity initial solution. Since no cross-linking will occur at this point, the polymer is still soluble in water and the aqueous Leclanche electrolyte.

An example of specific ingredients which are utilized in preparing such an initial solution follows in Table III below in the order in which they are used, with relative weight proportions indicated being based upon the weight of electrolyte:

TABLE III

| Ingredient | Amount |
|---|---|
| Leclanche electrolyte (24% NH₄Cl, 6.52% ZnCl₂, 0.585% HgCl₂, 69.2% H₂O) | 3000 ml. |
| Promoter | 29.9 ml. (0.8 wt.%) |
| Acrylamide Monomer | 168.5 grams (5 wt.%) |
| Polymerization Catalyst | 35.5 grams (1 wt.%) |

These ingredients are added with a minimum of stirring to the electrolyte in the order indicated to obtain an initial solution. The promoter used may be β-dimethylamino propionitrile, which may also be identified by the trademark Cyanogum 41, or it may be TMED (N,N,N′, N′-tetramethyl ethylenediamine), and the polymerization catalyst may be ammonium persulfate. The solution is stirred only until each ingredient has been dissolved and then the solution is allowed to stand for 24 hours at ambient room temperature to insure complete polymerization. After the polymerization period, the prethickened solution is briefly stirred and then heated for 24 hours at 71°C. in order to destroy remaining persulfate free radicals which, if present in the solution, could cause further polymerization when unreacted monomer is later added. The viscosity of this heat treated solution will be found to be about 400 seconds at room temperature of 25°C. Under the same test conditions water would have a viscosity of 9 seconds.

The viscosity test consisted simply of measuring the time required for a specific volume of solution to pass through a restricted orifice 0.50 cm. in diameter in the bottom of a cupped container. This type of viscosity test is contemplated throughout the present specification where reference is made to specific viscosity levels.

Thus, there is achieved a prethickened, homogeneous, stable polyacrylamide-electrolyte solution having a controlled viscosity which is within a predetermined range of values equal to or slightly higher than the viscosity suitable for filling cells, i.e. 400–600 seconds as determined by the previously described test procedure which is equivalent to 1600–2400 centipoise. Furthermore, the viscosity of this initial solution will be stable under appropriate conditions even when it is combined with the ingredients for forming the final gelled separator, i.e., monomer, cross-linking agent and promoter, with the exception of the polymerization catalyst. Having once achieved this predetermined viscosity range, addition of more acrylamide monomer will not appreciably alter the viscosity of the initial solution. If the viscosity level achieved is greater than the optimum level for assembly, addition of Leclanche electrolyte can be utilized to reduce the viscosity of the initial solution as desired. A viscosity range of 400–600 seconds is considered optimum if acrylamide is the monomer to be subsequently used with the initial solution for preparing the gelled separator. This range has also been found satisfactory with a wide variety of other vinyl monomers.

Once optimum viscosity has been achieved, the initial solution can subsequently be combined with the necessary additional ingredients for forming the gelled separator, whereupon this combined solution may be placed in the cell and permitted to gel in place. The additional ingredients which, together with the initial solution, are used to form the gelled separator are: additional monomer, which may be acrylamide or another vinyl monomer; polymerization catalyst, which may be ammonium persulfate; promoter, which may be Cyanogum 41 or TMED; and a cross-linking agent, which may be methylene bis-acrylamide.

For convenient assembly of Leclanche cells on a commercial scale, the following general procedure has been developed to prepare the gelled separators of this invention.

1. Prepare two batches of initial solution comprising polyacrylamide-prethickened Leclanche electrolyte with each batch being of equal weight and of an appropriate viscosity level.

2. In one batch of initial solution, dissolve appropriate amounts of the vinyl monomer to be used, as well as the cross-linking agent and the promoter thereby to form a combined solution which may be identified as Solution A.

3. Add an appropriate amount of polymerization catalyst to the other batch of initial solution thereby to form a combined solution which may be identified as Solution B.

4. Mix equal weights of each of Solutions A and B, avoiding formation of bubbles in the mixture, and insert the mixture into cell containers.

5. Insert the molded bobbin as close to the onset of gelation of the mixture as possible to minimize bobbin penetration before gelation.

The following Table IV gives a specific example of ingredients that may be mixed in this manner to obtain a gelled separator using any useful NH₄Cl — ZnCl₂ — H₂O electrolyte.

TABLE IV

| Ingredient | Amount | % Prethickened Electrolyte Wt. |
|---|---|---|
| Solution A | | |
| initial solution of polyacrylamide-prethickened Leclanche electrolyte (400 sec. viscosity) from Table III | 50.0 g. | — |
| acrylamide monomer | 11.14 g. | 20.0 |
| cross-linking agent | 1.12 g. | 2.0 |
| promoter | 1.0 ml. | 1.8 |
| Solution B | | |
| initial solution of polyacrylamide-prethickened Leclanche electrolyte (400 sec. viscosity) from Table III | 50.0 g. | — |
| polymerization catalyst | 1.0 g. | 2.0 |

By mixing equal weights of Solutions A and B, there will be achieved a gelled separator containing 10% by weight cross-linked polyacrylamide which concentration has been found to give best overall cell performance in the case of this monomer.

Solutions, such as Solutions A and B above, which are prepared by combining gelling ingredients with quantities of "initial" solution, shall be referred to herein as "combined" solutions.

Other vinyl monomers, instead of acrylamide, may be used to form combined solutions such as Solution A exemplified above, acrylamide being only one specific example of a large number of such vinyl monomers which may be used. However, in determining the practical optimum usefulness of vinyl monomers, the important restrictions set forth and discussed previously herein in connection with the question of choice of monomer should be observed.

It is probable that the viscosity range of 400–600 seconds considered optimum for the initial solution which was used with the acrylamide-monomer combined solution e.g., Solution A above, may not be suitable when other vinyl monomers are used to form the combined solution. Indeed, each monomer may entail an individual optimum viscosity of the initial solution to insure prevention of bobbin penetration.

A concentration of 10 percent polymerized monomer in the gelled separator, which was found preferable for acrylamide out of the general useful range of 2 to 18 percent, may not be most appropriate for other monomers, and differing individual monomer concentrations in the gel may be indicated. Also, the promoter Cyanogum 41 mentioned previously in connection with acrylamide may not be appropriate for use with other monomers, and a different promoter such as TMED or differing concentrations of Cyanogum 41 may be more appropriate.

The following is a specific example of the preparation of a gelled separator in accordance with the invention, using as gelling agent for the combined solution a vinyl monomer other than acrylamide together with the initial solution prepared as described earlier. The vinyl monomer in this instance is acrylic acid neutralized with TMED.

TABLE V

| Ingredient | Amount | % Pre-thickened Electrolyte Wt. |
|---|---|---|
| Solution A[1] | | |
| initial solution of polyacrylamide prethickened Leclanche electrolyte (24% NH$_4$Cl, 6.5% ZnCl$_2$, 0.58% HgCl$_2$, 69.2% H$_2$O; 400–600 sec. viscosity) | 50.0 g. | — |
| acrylic acid (glacial, 99+% pure; d = 1.062 g/ml) | 2.0 ml. | 4 |
| cross-linking agent | 1.12 g. | 2 |
| TMED promoter | 2.0 ml. | 3.8 |
| Solution B[1] | | |
| initial solution of polyacrylamide-prethickened Leclanche electrolyte (same composition as above; 400–600 sec. viscosity) | 50.0 g. | — |
| polymerization catalyst | 1.0 g. | 2 |

TMED is used here not only as a promoter, but also as a strong base to neutralize the acrylic acid monomer. Cyanogum 41 is not as strong a base and neutralization of a relatively weak acid such as acrylic acid is not as complete. Since acrylic acid even when neutralized polymerizes more slowly than acrylamide, Cyanogum 41 is not strong enough as a polymerization promoter to result in gels in a reasonably short time, and thus the stronger TMED promoter is necessary.

By mixing equal weights of Solutions A[1] and B[1] from Table V above at room temperature in Leclanche D-size zinc cans, a gel containing 2% cross-linked polyacrylic acid results at room temperature. Bobbins may be inserted 4–6 minutes after Solutions A[1] and B[1] are mixed.

3. Utilization of a Complexing Agent in a Prethickened Electrolyte Solution of Polyacrylamide Combined in a Gelling Solution with Additional Vinyl Monomer which is Polymerized and Cross-linked The preferred embodiment of the present invention combines the two specific aspects described previously herein. In this preferred embodiment, the final gelled electrolyte-separator layer is formed by a process which utilizes both a complexing agent to deal with the solution impurities and a prethickening step involving prepolymerization of acrylamide monomer to form an initial solution.

In a specific example of this preferred embodiment of the invention the complexing agent is added in a proportional range of 1 to 5 grams of complexing agent, e.g. 1.0 gram of Versene Fe-3 representing 0.3 wt. % of electrolyte, to 300 ml. of Leclanche electrolyte which represents an electrolyte weight of from 330 to 390 grams. 2.5 Ml of Cyanogum 41 promoter, representing about 1.0 wt. %, may be added next, followed by 17.0 grams of acrylamide monomer representing about 4.75 wt. %. Acrylamide monomer may be added within a range of about 3 to 6 wt. % depending upon the specific type of Leclanche electrolyte utilized, e.g. 4–6 wt. % acrylamide monomer with electrolyte containing 23% NH$_4$Cl and 28% ZnCl$_2$, and 3–4% acrylamide monomer with electrolyte containing 24% NH$_4$Cl and 6.52% ZnCl$_2$.

After these components are completely dissolved in the electrolyte using minimum stirring with a magnetic stirrer and a stirring bar coated with a plastic covering, preferably Teflon, to prevent metal contamination of the electrolyte, 3.3 grams of ammonium persulfate polymerization catalyst, representing 1.0 wt. %, may then be dissolved in the solution which is then allowed to polymerize at room temperature for 24 hours. After uniform mixing, the solution should next be given heat treatment for 24 hours at 71°C. to destroy unreacted free radicals and persulfate thereby to prevent further undue polymerization when additional monomer is present.

At this point, the viscosity of the prethickened initial solution obtained will be 4000 seconds. This may be compared to a viscosity of about 400 seconds attained with the specific example previously described herein in connection with Table III where no complexing agent was utilized. It should be noted that this higher viscosity is attained by utilizing approximately the same relative weight of acrylamide monomer, i.e. 4.75 wt. % with the complexing agent and 5.0 wt, % without a complexing agent. Furthermore, significantly higher viscosities can be achieved in the presence of complexing agents by lowering the concentration of the polymerization catalyst. For example, the 4000 seconds viscosity cited above may be raised to 54,000 seconds by lowering the concentration of ammonium persulfate to 0.1 wt. %.

A further advantage attainable through use of a complexing agent is an increase in gel setting time. For example, by utilizing the components previously discussed within the ranges of relative proportions mentioned, it is possible to achieve with an electrolyte containing 2–23 ppm iron an increase in gel setting time from within the range 15–35 seconds to 3–7 minutes or more, depending upon the type and concentration of the specific complexing agent utilized. These results would be obtained without regard to whether the iron concentration was at the upper end of the range, at 23 ppm, or at the lower end, at 2 ppm. This control of gelling time can be highly significant when considering mass production techniques for cells assembled according to the present invention.

The cost can be significantly reduced through use of a complexing agent, not only because less acrylamide monomer is necessary for a given viscosity, but also because commercial grade zinc chloride could then be used along with tap water rather than distilled water. Thus, the already low cost of acrylamide as a prethickening agent in the initial solution and of acrylamide and other vinyl monomers as gelling agents, can be further significantly reduced with these materials becoming more readily adaptable to mass production cell manufacture techniques.

These and other important advantages obtainable through utilization of a complexing agent together with the prethickening step make this a significant and valuable aspect of the invention described herein.

A specific example of this preferred embodiment of the invention is given in Table VI below, wherein an initial solution of polyacrylamide-prethickened electrolyte is prepared, incorporating the use of a complexing agent. Large quantities of Leclanche electrolyte can be conveniently prethickened in this manner.

Mix the following ingredients in the order given at room temperature using Teflon-coated magnetic stirring bars and stirring only until each material is dissolved.

TABLE VI

| Ingredient | Amount | % By Weight |
|---|---|---|
| Leclanche electrolyte (24% NH$_4$Cl, 6.5% ZnCl$_2$, 69.2% H$_2$O, 0.58% HgCl$_2$, 9 seconds viscosity; d = 1.12 g/ml; 2 ppm Fe) | 3000 ml. | — |
| Versene Fe-3 complexing agent | 10 g. | 0.3 |
| Cyanogum 41 promoter | 25.5 ml. | 0.8 |
| acrylamide monomer | 129.0 g. | 3.7 |
| ammonium persulfate | 3.0 g. | 0.1 |

This mixture is allowed to stand at ambient room temperature for 24 hours and is then stirred. After stirring, it is heated in an oven for another 24 hours at 71°C to destroy excess persulfate free radicals, and is finally cooled to room temperature.

Viscosities of a number of runs of the above, using different acrylamide samples and different samples of electrolytes are indicated in Table VI-a below:

TABLE VI-a

| Sample | Viscosities (sec.) |
|---|---|
| 2 ppm Fe in electrolyte (3.7% acrylamide) | 506 |
| | 607 |
| | 521 |
| | 547 |
| | 532 |
| | 678 |
| No Fe in electrolyte (3.7% acrylamide) | 1192 |
| | 1181 |
| | 1201 |
| No Fe in electrolyte (3.3% acrylamide) | 601 |
| | 580 |
| | 595 |

Table VII below shows another example of a preferred embodiment of this aspect of the invention using a Leclanche electrolyte having a different NH$_4$Cl/ZnCl$_2$ ratio wherein an initial solution of polyacrylamide-prethickened electrolyte is prepared incorporating the use of a complexing agent.

TABLE VII

| Ingredient | Amount | % By Weight |
|---|---|---|
| Leclanche electrolyte (23% NH$_4$Cl, 28% ZnCl$_2$, 49% H$_2$O, 0.25% HgCl$_2$; Fe free; d = 1.300 g/ml) | 3000 ml. | — |
| Versene Fe-3 | 10 g. | 0.3 |
| Cyanogum 41 promoter | 32.8 ml. | 0.8 |
| acrylamide monomer | 162.5 g. | 4.0 |
| ammonium persulfate | 3.9 g. | 0.1 |

The same procedure outlined above in Table VI is followed. The viscosities of a number of runs, using different acrylamide samples, different samples of the electrolyte, etc. are indicated in Table VII-a below:

TABLE VII-a

| Sample | Viscosities (secs.) |
|---|---|
| 2 ppm Fe in electrolyte | |
| 3.7% acrylamide | 9300 |
| 3.0% acrylamide | 1440 |
| 2.8% acrylamide | 1201 |
| No Fe in electrolyte | |
| 4.0% acrylamide | 392 |
| 4.0% acrylamide | 458 |
| 4.0% acrylamide | 421 |
| 4.0% acrylamide | 501 |
| 4.0% acrylamide | 465 |
| 4.0% acrylamide | 405 |
| 4.0% acrylamide | 523 |

After preparation of the initial solution either as indicated in Table VI or Table VII above the initial solution is prepared in two separate batches each comprising equal amounts. Additional vinyl monomer, which may be acrylamide but need not be limited thereto, is added to one batch to form a combined solution which may be identified as Solution A$^2$, together with a cross-linking agent and a promoter. Polymerization catalyst is added to the other batch of initial solution to form a combined solution which may be identified as Solution B$^2$.

A detailed example of this specific aspect of the present invention is shown in Table VIII below, therein another vinyl monomer, methacrylic acid neutralized with TMED, is used in conjunction with an initial solution comprising polyacrylamide-prethickened electrolyte prepared as shown in Table VII.

TABLE VIII

| Ingredient | Amount | % Pre-thickened Electrolyte Wt |
|---|---|---|
| Solution A$^2$ | | |
| initial solution of polyacrylamide-prethickened electrolyte from Table VII (400–600 sec viscosity) | 50.0 g | — |
| methacrylic acid (glacial, 99+% pure, d = 1.015 g/ml) | 2.0 ml | 4 |
| cross-linking agent | 1.12 g. | 2 |
| TMED promoter | 4.0 ml | 7.6 |
| Solution B$^2$ | | |
| initial solution of polyacrylamide-prethickened electrolyte from Table VII (400–600 sec viscosity) | 50.0 g | — |
| polymerization catalyst | 1.12 g | 2 |

Since monomers polymerize more slowly in the type of Leclanche electrolyte utilized above (high ZnCl$_2$ concentration), more TMED is needed for methacrylic acid than for the acrylic acid example shown in Table V.

Moreover, methacrylic acid polymerizes more slowly then acrylic acid in Leclanche electrolyte, so that more TMED is again required to obtain gelation in a usefully short time.

By mixing equal weights of Solutions A2 and B2 in, for example, a Leclanche D-size can, there results an electrolyte-separator solution which produces a gel containing 2% cross-linked polymethacrylic acid at room temperature. Bobbins are inserted 5–9 minutes after Solutions A2 and B2 are mixed and poured into the cell containers. After polymerization and cross-linkging, the mixed solution gels to form an electrolyte-immobilizing separator layer exhibiting the superior properties and characteristics previously described.

Two additional embodiments of this specific aspect of the invention are set forth in Tables IX and X below:

TABLE IX

| Ingredient | Amount | % Prethickened Electrolyte Wt. |
|---|---|---|
| Solution A³ | | |
| Initial solution of polyacrylamide prethickened electrolyte (400–600 sec. viscosity) prepared as in Table VI | 50.0 g. | — |
| Calcium or Magnesium Acrylate | 2.2 g. | 4.21 |
| Crosslinking agent | 1.12 g. | 2.0 |
| TMED promoter | 0.20 ml. | 0.4 |
| Solution B³ | | |
| Initial solution of polyacrylamide prethickened electrolyte (400–600 sec. viscosity) prepared as in Table VI | 50.0 g. | — |
| polymerization catalyst | 1.12 g. | 2.0 |

Mix equal weights of solution A³ and B³ and insert into a D-size container at room temperature. Bobbins are inserted 15 minutes after the solutions are mixed.

TABLE X

| Ingredients | Amount | % Prethickened Electrolyte Wt. |
|---|---|---|
| Solution A⁴ | | |
| Initial solution of polyacrylamide-prethickened electrolyte (400–600 sec. viscosity) prepared as in Table VI | 50.0 g. | — |
| Acryloyl chloride | 2.2 ml. | 4.4 |
| Crosslinking agent | 1.12 g. | 2.0 |
| TMED promoter | 4.0 ml. | 7.6 |
| Solution B⁴ | | |
| Initial solution of polyacrylamide-prethickened electrolyte (400–600 sec. viscosity) prepared as in Table VI | 50.0 g. | — |
| polymerization catalyst | 1.12 g. | 2.0 |

Mix equal weights of solutions A⁴ and B⁴ and pour into a D-size cell container at room temperature. Bobbins are inserted 30 seconds after the solutions are mixed.

It will be appreciated that in the practice of the present invention, the specific viscosity levels which are maintained may vary widely between different cells depending upon factors and conditions prevalent in the manufacture of individual cells. Application of the principles of the present invention will enable one skilled in the art to determine and control viscosity levels appropriate for each cell thereby avoiding the difficulties previously discussed, including undue liquid bobbin penetration.

The specific viscosity levels which are maintained during practice of the invention will be dependent upon factors and conditions prevalent during cell assembly. If, in the manufacture of cells, the viscosity level of the electrolyte-separator solution is too low or the time required for gelation is too long, bobbin penetration by liquid can occur and the integrity of the cathode will be destroyed. In order to prevent this, either the viscosity of the solution must be increased as much as practical or the gelling time must be shortened. The upper limit of viscosity of the electrolyte-separator solution must not be so high that it interferes with insertion of the bobbin during cell assembly.

In addition to the foregoing, the composition and structural characteristics of the bobbin will likewise have an effect upon the assembly parameters which are to be maintained. A stronger bobbin will be able to withstand greater pressures during cell assembly when the electrolyte-separator solution is forced to flow into the annular space between the bobbin and the zinc can, thereby permitting utilization of higher viscosities and, consequently, of a longer gel setting time.

It will, of course, be understood that the viscosity of a particular electrolyte-separator solution will be lowest when the solution is first introduced into the cell, and that it will increase as gelation proceeds until the final gel is formed. Accordingly, additional factors to be considered are the time at which the bobbin is first inserted into the cell and the pressure applied to force the electrolyte-separator solution into position around the bobbin.

In a specific example of a cell manufactured in accordance with the present invention utilizing for the electrolyte separator solution the composition set forth in Table VIII and comprising a bobbin having optimum structural characteristics, it was found that with a gel setting time of between 5–9 minutes, the preferred range of viscosity of the electrolyte-separator solution prior to the onset of gelation was between 400 and 600 seconds, with the maximum tolerable viscosity being 1500–2000 seconds and the minimum tolerable viscosity being 200–300 seconds and with the bobbin being introduced approximately 5–9 minutes after introduction of the gelling solution.

What is claimed is:

1. An improvement in the method for making an electrolyte immobilizing separator for a Leclanche cell of the type employing a comparatively dry pressure-molded bobbin of depolarizer mix, and a zinc anode which also serves as a cell container, the improvement comprising introducing into said cell container a separator forming material comprising a solution of vinyl material and electrolyte under predetermined and controlled viscosity levels, introducing said bobbin into said cell container in a manner such as to form a layer of separator material between said cell container and said bobbin while simultaneously gelling said solution by polymerization and cross-linking thereof in situ, and controlling the viscosity of said solution during said gellation, said separator forming material being prepared by forming an initial solution of polyacrylamide and electrolyte, and combining said initial solution with vinyl monomer and appropriate gelling agents.

2. A method according to claim 1 wherein a complexing agent is added in the formation of said initial solution of polyacrylamide and electrolyte.

3. A method according to claim 1 wherein said separator forming material is prepared by the steps of forming an initial solution of polyacrylamide and electrolyte, subsequently forming combined solution by combining said initial solution and vinyl monomer, and polymerizing and cross-linking said combined solution in situ.

4. A method according to claim 3 wherein said initial solution of polyacrylamide and electrolyte is formed by forming a solution of acrylamide monomer and electrolyte and polymerizing said acrylamide monomer in said electrolyte solution.

5. A method according to claim 4 comprising the steps of allowing said initial solution to stand for about 24 hours at ambient room temperature, and subsequently heating said solution for about 24 hours at about 71°C.

6. A method according to claim 3 wherein a complexing agent having a high affinity for transition metal ions is added to the electrolyte utilized in forming said initial solution.

7. A method according to claim 3 wherein a promoter and a polymerization catalyst are included in said initial solution of polyacrylamide electrolyte.

8. A method according to claim 7 wherein said promoter is β-dimethylamino propionitrile.

9. A method according to claim 3 wherein said vinyl monomer utilized in forming said combined solution is acrylamide.

10. A method according to claim 1 wherein said separator forming material is prepared by the steps of:
forming a first and a second initial solution of polyacrylamide and electrolyte;
combining with said first initial solution vinyl monomer, a cross-linking agent and a promoter;
combining with said second initial solution a polymerization catalyst, and;
mixing said combined first initial solution.

11. A method according to claim 1 wherein said separator forming material is prepared by the steps of:
forming a first and a second initial solution, each of said initial solutions being formed by mixing electrolyte, a complexing agent having a high affinity for transition metal ions, a promoter, acrylamide monomer and a polymerization catalyst;
separately polymerizing equal quantities of said first and said second initial solutions;
combining with said first polymerized initial solution vinyl monomer, a cross-linking agent and a promoter;
combining with said second polymerized initial solution a polymerization catalyst, and;
mixing said first and second combined initial solutions.

12. A method according to claim 11 wherein said complexing agent is a mixture of three parts ethylenediaminetetraacetic acid and one part N-hydroxymethyl ethylenediaminetriacetic acid.

13. An improvement in the method for making an electrolyte immobilizing separator for a Leclanche cell of the type employing a comparatively dry pressure-molded bobbin of depolarizer mix, and a zinc anode which also serves as a cell container, the improvement comprising introducing into said cell container a separator forming material comprising a solution of vinyl material, a complexing agent having a high affinity for transition metal ions said complexing agent being selected from the group consisting of nitrilotriacetic acid and N-methylaminodiacetic acid, and electrolyte under predetermined and controlled viscosity levels, introducing said bobbin into said cell container in a manner such as to form a layer of separator material between said cell container and said bobbin while simultaneously gelling said solution by polymerization and cross-linking thereof in situ, and controlling the viscosity of said solution during said gellation.

* * * * *